(12) United States Patent
Ishiguro et al.

(10) Patent No.: US 6,793,397 B2
(45) Date of Patent: Sep. 21, 2004

(54) ROTATION SUPPORT APPARATUS FOR COMPRESSOR PULLEY

(75) Inventors: Hiroshi Ishiguro, Tokyo (JP); Hideo Ouchi, Tokyo (JP); Masato Taniguchi, Tokyo (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/639,353

(22) Filed: Aug. 12, 2003

(65) Prior Publication Data

US 2004/0032999 A1 Feb. 19, 2004

Related U.S. Application Data

(63) Continuation of application No. 09/957,685, filed on Sep. 20, 2001, now Pat. No. 6,659,649.

(30) Foreign Application Priority Data

| Jan. 30, 2001 | (JP) | 2001-021078 |
| Jan. 30, 2001 | (JP) | 2001-022286 |
| Feb. 9, 2001 | (JP) | 2001-033522 |
| May 22, 2001 | (JP) | 2001-152256 |
| Jun. 13, 2001 | (JP) | 2001-178113 |

(51) Int. Cl.[7] ............................................. F16C 19/06
(52) U.S. Cl. ........................ 384/450; 384/517; 384/547
(58) Field of Search ................................. 384/450, 517, 384/547, 537, 516

(56) References Cited

U.S. PATENT DOCUMENTS

| 2,938,757 A | 5/1960 | Pieper |
| 3,278,110 A | 10/1966 | Heidorn |
| 4,621,983 A | 11/1986 | Thomas et al. |
| 6,010,420 A | 1/2000 | Niki et al. |
| 6,116,786 A | 9/2000 | Takata et al. |
| 6,244,408 B1 | 6/2001 | Tobayama et al. |
| 6,273,230 B1 | 8/2001 | Nakano et al. |

FOREIGN PATENT DOCUMENTS

| FR | 2 801 944 | 6/2001 |
| JP | 58-152967 A | 9/1983 |
| JP | 08-178022 | 7/1996 |
| JP | 09-119510 | 5/1997 |
| JP | 09-126303 | 5/1997 |
| JP | 11-210766 | 8/1999 |
| JP | 11-336795 | 12/1999 |
| JP | 2000-002271 | 1/2000 |
| JP | 2000-120668 | 4/2000 |
| JP | 2000-170752 | 6/2000 |

*Primary Examiner*—Lenard A. Footland
(74) *Attorney, Agent, or Firm*—Katten Muchin Zavis Rosenman (57) ABSTRACT

A radial ball bearing 14 of the three point contact type or four point contact type is used for the rolling bearing for a compressor pulley. The offset amount $\delta$, that is the axial distance between the center $\alpha$ of the radial load applied to the follower pulley 4 from the endless belt 11, and the center $\beta$ of the radial ball bearing 14 is 40% or less of the diameter of the pitch circle. In addition, the radial clearance of the radial ball bearing 14 is 0.2% or less of the diameter of the pitch circle. With this construction, the durability of the rolling bearing to support the follower pulley 4 is secured while made compact.

2 Claims, 10 Drawing Sheets

ROTATION SUPPORT APPARATUS FOR COMPRESSOR PULLEY

CROSS REFERENCE TO RELATED APPLICATION

This is a continuation of U.S. application Ser. No. 09/957,685 filed Sep. 20, 2001 now U.S. Pat. No. 6,659,649.

BACKGROUND OF THE INVENTION

1. Field of the Invention

This invention relates to a rotation support apparatus for a compressor pulley, and more particularly to a compressor pulley support apparatus which is installed for use in the rotation drive apparatus of a compressor for the air-conditioning apparatus of an automobile so as to support a follower pulley at the stationary portion, such as the housing, of the compressor such that the follower pulley can rotate freely for rotation drive of the compressor.

2. Description of the Related Art

The compressor installed in the air-conditioning apparatus of an automobile for compressing refrigerant is rotated by the engine for automobile operation. Therefore, there is an endless belt that runs between the follower pulley that is formed on the end of the rotating shaft of the compressor and the drive pulley that is fastened to the end of the crankshaft of the engine, and the rotating shaft of the compressor is rotated by the rotation of this endless belt.

Figure 7:
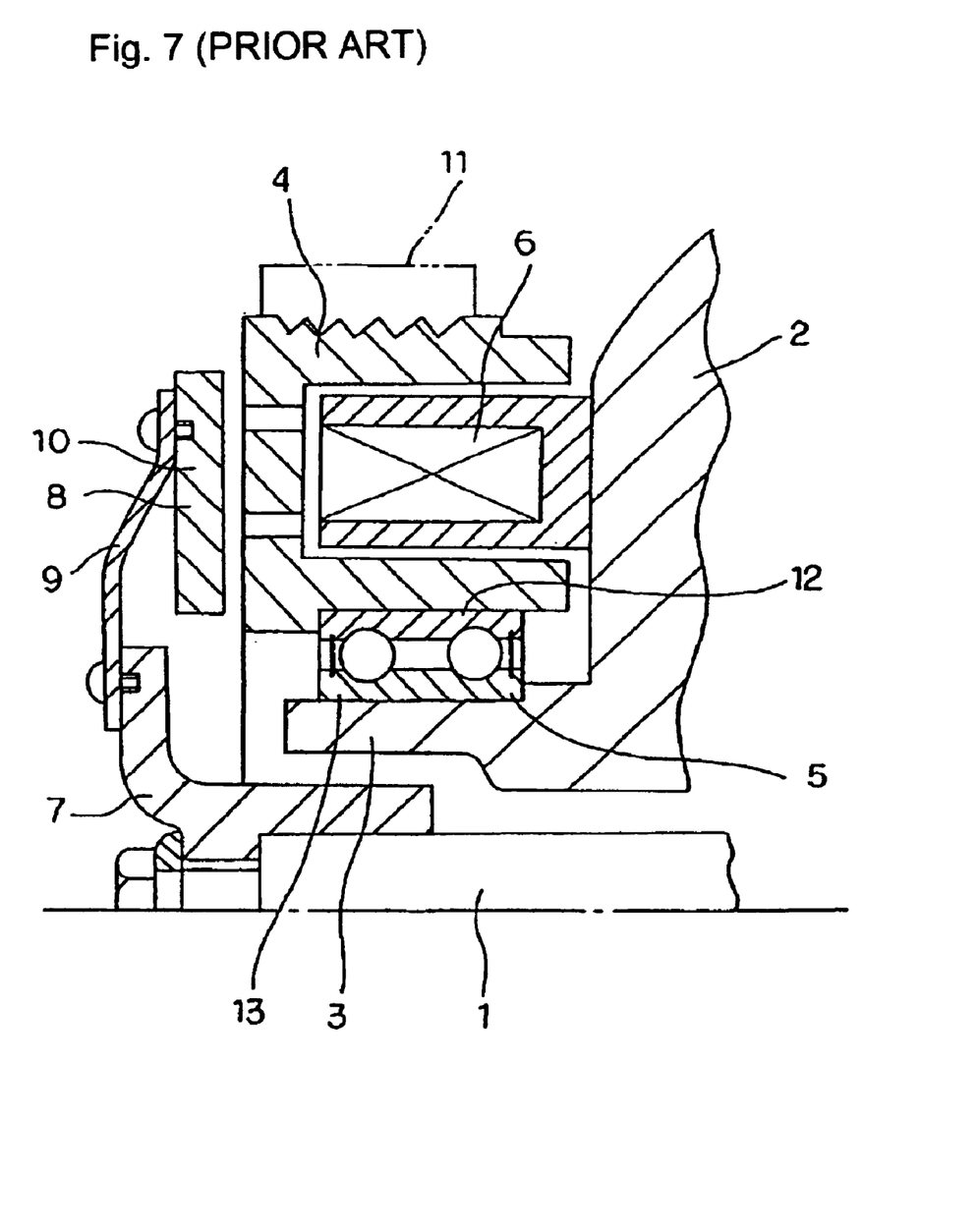
FIG. 7 is a partial cross sectional view to show a first example of the conventional structure.

FIG. 7 shows a construction of the rotation drive section of the rotating shaft 1 of the compressor. This rotating shaft 1 is supported inside a casing 2 by a rolling bearing (not shown in the figure) such that it rotates freely. A follower pulley 4 is rotatably supported around the support cylinder section 3 that is formed on the outer surface on the end of the casing 2, by a multi-row radial ball bearing 5. This follower pulley 4 is entirely ring shaped with a U-shaped cross section, and a solenoid 6 that is fastened to the end surface of the casing 2 is located in the space inside the follower pulley 4.

On the other hand, there is an installation bracket 7 that is fastened on the end of the rotating shaft 1 in the section that protrudes from the casing 2, and a ring-shaped plate 8 that is made of a magnetic material is supported by way of a plate spring 9 around this installation bracket 7. This ring-shaped plate 8 is separated from the follower pulley 4 as shown in FIG. 7 by the elastic force of the plate spring 9 when there is no electric current flowing to the solenoid 6, and it is attracted toward the follower pulley 4 when there is electric current flowing to the solenoid 6, such that rotation force is freely transmitted to the rotating shaft 1 from the follower pulley 4. In other words, the solenoid 6, ring-shaped plate 8 and plate spring 9 form an electromagnetic clutch 10 for engaging and disengaging the follower pulley 4 and rotating shaft 1.

As described above, when the follower pulley 4 is supported by a double-row radial ball bearing 5 such that it rotates freely, and when an eccentric load is slightly applied to the follower pulley 4 from the endless belt 11 that extends around the follower pulley 4, rarely does the center axis of the outer race 12 of the double-row radial ball bearing 5 come out of alignment (become tilted) with the center axis of the inner race 13. Moreover, this construction makes it possible to sufficiently secure the durability of the double-row radial ball bearing 5, as well as prevent tilting of the rotation axis of the follower pulley 4 and eccentric wear of the endless belt 11.

However, by using the double-row radial ball bearing 5, it is impossible to avoid an increase in dimensions in the axial direction. In many cases, the rotation support section for the follower pulley 4 must be located in a limited space, and therefore any increase in dimensions in the axial direction is not preferable. In addition, as the dimensions in the axial direction increase, the cost of component parts also increases.

In the case that a single-row, deep-groove radial ball bearing is used instead of the double-row radial ball bearing 5 as the roller bearing for supporting the follower pulley 4, it becomes easier to reduce the dimensions in the axial direction and to fit the bearing in a limited space. However, in the case of a single-row, deep-groove radial ball bearing, when the follower pulley 4 receives a moment load, the force for preventing tilting of the follower pulley 4 is small so the misalignment of the center axis of the outer race of the radial ball bearing with the center axis of the inner race becomes severe. As a result, durability of the radial ball bearing becomes inadequate and it becomes easy for excessive eccentric wear of the endless belt 11 that extends around the follower pulley 4 to occur.

Figure 8:
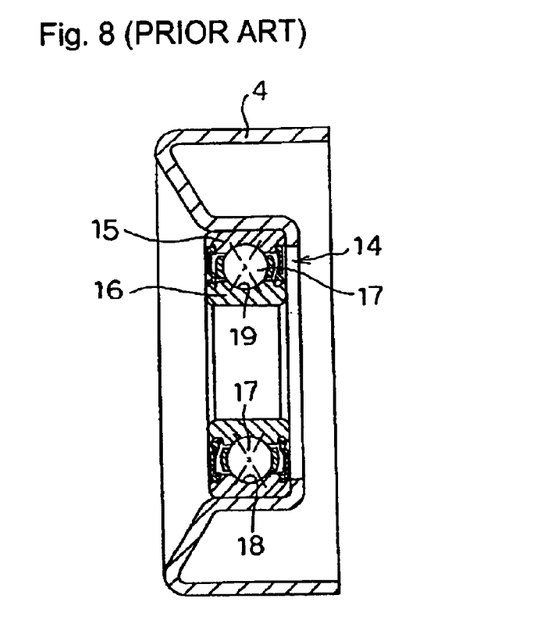
FIG. 8 is a partial cross sectional view to show a second example of the conventional structure.
Figure 9:
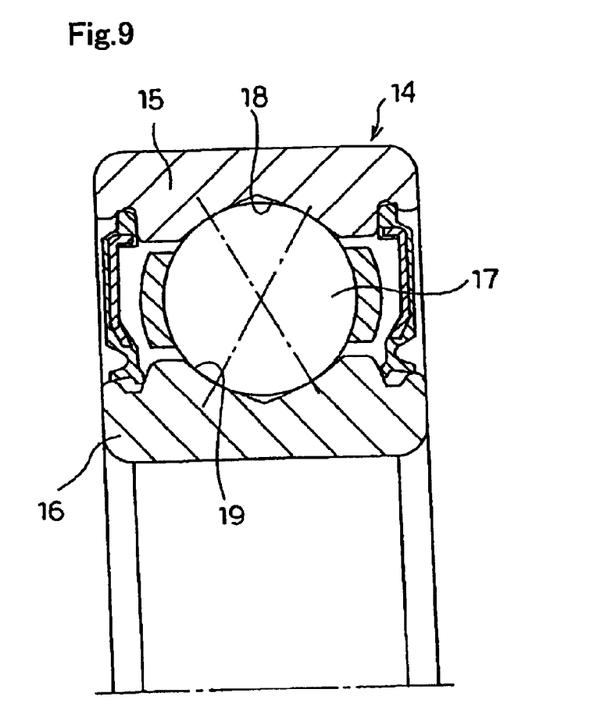
FIG. 9 is a partial enlarged view to show the radial ball bearing of the four point contact type.

In consideration of the aforementioned problems, use of a single-row, 4-point contact radial ball bearing for supporting the follower pulley, as disclosed in Japanese Patent Publications Nos. Tokukai Hei 9-119510, and Tolcukai Hei 11-336795, has been known. FIG. 8 and FIG. 9 show a second example of the prior construction as disclosed in Japanese Patent Publication No. Tokukai Hei 9-119510.

In this second example of the prior construction, the follower pulley 4 is made of sheet metal by a bending process such as pressing, and is such that it can be rotatably supported around a support section (not shown in the figure) by a single-row, 4-point contact radial ball bearing 14. This radial ball bearing 14 comprises an outer race 15 and inner race 16, which are concentrically supported, and a plurality of balls 17. Of these, an outer-ring raceway 18 is formed around the inner peripheral surface of the outer race 15, and an inner-ring raceway 19 is formed around the outer peripheral surface of the inner race 16. Both of these raceways 18, 19 have a gothic arch-shaped cross section having a pair of arcs that both have a radius of curvature that is more than ½ of the diameter of the balls 17 and intersect each other at the mid portion. Accordingly, the rolling surface of the balls 17 comes into contact with the raceways 18, 19 at two points respectively, so that there are four contact points in total for each of the balls 17.

This kind of 4-point contact type radial ball bearing 14 is more rigid against moment loads than a typical single-row, deep-groove radial bearing, and when a moment load is received, it is very difficult for the center axis of the outer race 15 to come out of alignment with the center axis of the inner race 16. Therefore, it is possible to alleviate eccentric wear to the endless belt 11 (see FIG. 7) that extends around the follower pulley 4 when compared with a pulley rotation support apparatus for a compressor that uses a typical single-row, deep-groove radial ball bearing.

In Japanese Patent Publication No. Tokukai Hei 11-336795, the 4-point contact type radial ball bearing described above is assembled in the rotation support section of the follower pulley for the compressor drive, and furthermore, an electromagnetic clutch is placed between the follower pulley and the rotating shaft of the compressor.

Figure 10:
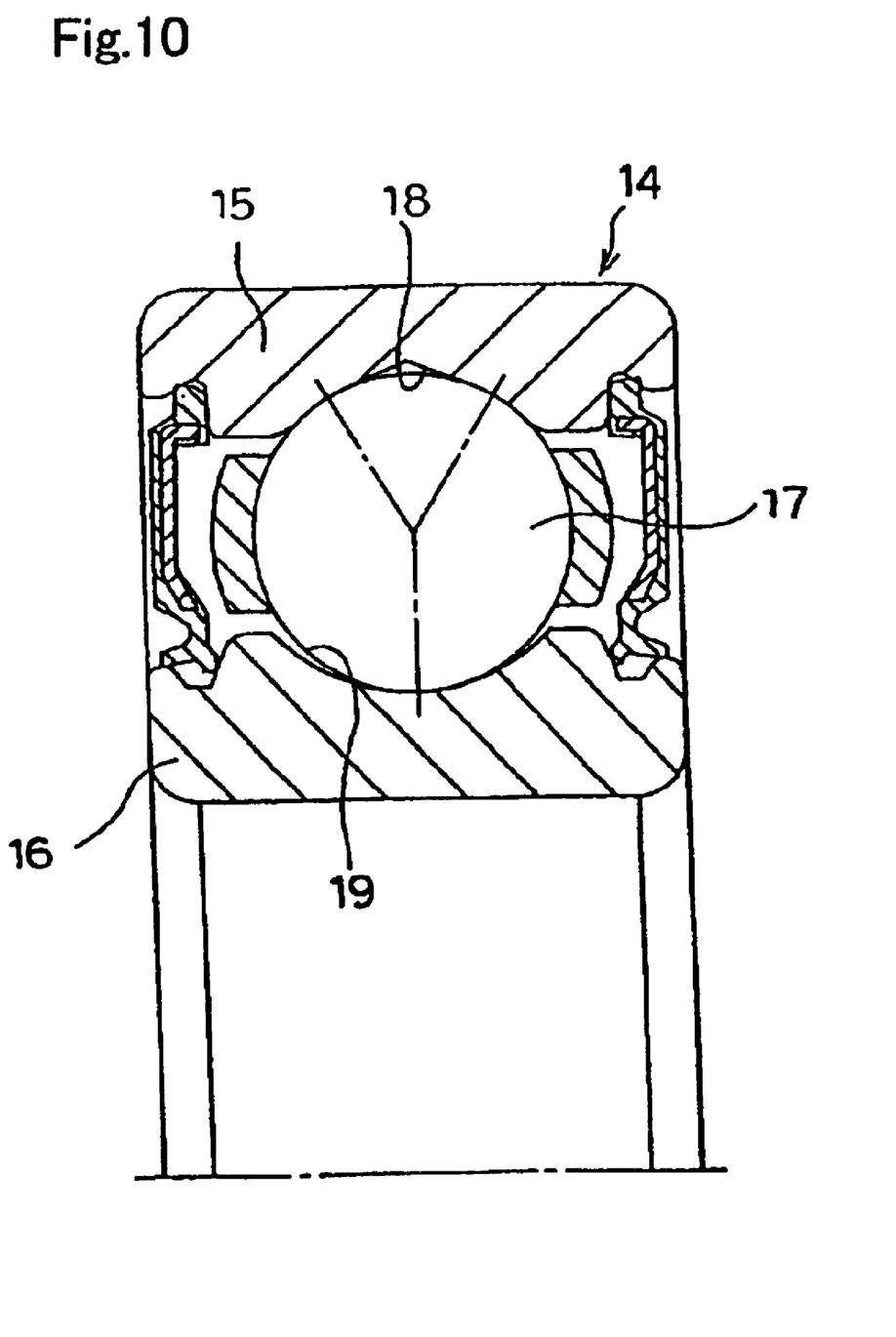
FIG. 10 is a partial enlarged view to show the radial ball bearing of the three point contact type.

Moreover, as shown in FIG. 10, even in the case of a single-row ball bearing 14 of the 3-point contact type, the rigidity against moment loads is greater than for a typical single-row, deep-groove radial ball bearing, and when a moment load is received, it is difficult for the center axis of the outer race 15 to come out of alignment with the center axis of the inner race 16. This 3-point contact type ball bearing 14 has an inner-ring raceway 19 formed around the outer peripheral surface of the inner race 16 such that its cross section is arc shaped to have a single radius of curvature that comes in contact with the rolling surface of the ball 17 at one point, and a gothic arch-shaped outer-ring raceway 18 formed around the inner peripheral surface of the outer race 15, that comes in contact at two points with the rolling surface of the ball 17 in the same way as the radial ball bearing 14 of the 4-point contact type shown in FIG. 9. In the case of supporting the pulley of a compressor with this kind of 3-point contact ball bearing 14 as well, it is possible to alleviate eccentric wear to the endless belt 11 (see FIG. 7) that extends around the follower pulley 4 when compared with a pulley rotation support apparatus for a compressor that uses a typical single-row, deep-groove radial ball bearing.

In contrast to the construction shown in FIG. 10, a 3-point contact type ball bearing in which the rolling surface of the ball comes in contact with the outer-ring raceway at one point, and the inner-ring raceway at two points, has the same effect.

As mentioned above, in the case of assembling a 3-point contact radial ball bearing or 4-point contact radial ball bearing in the support section for rotatably supporting a follower pulley for the compressor drive, it is possible to sufficiently secure both of the compact size, lightness of weight and the durability of the bearing. However, in these prior art cases, since the dimensions of all parts were not sufficiently examined, it was not always possible to obtain adequate results.

SUMMARY OF THE INVENTION

An objective of this invention is to provide a rotation support apparatus for compressor pulley that will solve the problems described above.

BRIEF DESCRIPTION OF THE INVENTION

DETAILED DESCRIPTION OF THE PREFERRED EMBODIMENT

The rotation support apparatus for compressor pulley of this invention comprises: in the same way as that of the conventional compressor pulley support apparatus described above, a rotating shaft; a stationary support section that is formed around the rotating shaft; a rolling bearing that is, supported by this stationary support section; and a pulley that is supported by the rolling bearing such that it rotates freely around the support section, and around which an endless belt is extended.

Moreover, similar to the rolling bearing disclosed in Japanese Patent Publications Nos. Tokukai Hei 9-119510 and Tokukai Hei 11-336795 described above, the rolling bearing is a radial ball bearing of the single-row 3-point contact type or 4-point contact type, which comprises: an inner race having an inner-ring raceways formed around its outer peripheral surface that is shaped such that it comes in contact with the rolling surface of the balls at one or two points; an outer race having an outer-ring raceway formed around its inner peripheral surface that is shaped such that it comes in contact with the rolling surface of the balls at one or two points; and a plurality of balls located and freely rotating between the inner-ring raceway and outer-ring raceway; and where at least one of the inner-ring raceway and outer-ring raceway comes in contact with the rolling surface of each of the balls at two points.

Particularly, in the case of the rotation support apparatus for compressor pulley of this invention, the offset amount, specifically distance in the axial direction between the center of the endless belt coming in contact with the outer peripheral surface portion of the pulley and the center of the radial ball bearing is 40% or less of the diameter of the pitch circle of the radial ball bearing.

Preferably, the radial clearance for a standalone radial ball bearing (before the inner and outer races are fitted with the mating members) is 0.2% or less of the diameter of the pitch circle of the radial ball bearing, or 1.5% or less of the diameter of the balls.

Moreover, it is preferable that the aforementioned offset amount is 20% or less of the diameter of the pitch circle, and even more preferable that it is 10% or less. Furthermore, when necessary, the lower limit of the offset amount can be 1 mm or greater.

Furthermore, it is preferable that the invention is combined with one or two or more of the following items 1 thru 5 in construction.

1. The groove depth of the inner-ring raceway and outer-ring raceway is 18% or more of the diameter of the balls.

2. The radial ball bearing is filled with grease containing a base oil, which is one or two or more synthetic oils selected from the group of ether, ester and polyolefin oils, a urea thickening agent, and at least Ba, Zn and ZnDTC as additives.

3. At least one process of the nitriding and dimension stabilization is performed for at least one member of the inner race, outer race and balls.

4. The balls are held in the pockets of a retainer such that they can rotate freely, and the inner dimension of the pockets in the circumferential direction of the retainer is 1.03 times or more than the diameter of the balls.

5. The width dimension of the cross-section of the radial ball bearing is 1.3 times or more than the height dimension in the radial direction.

The items 1 thru 5 in construction above, separate from the present invention, and independently or arbitrarily in combination, can be applied to the radial ball bearing of the 3-point or 4-point contact type of the rotation support apparatus for compressor pulley.

With the rotation support apparatus for compressor pulley of this invention, constructed as described above, it is possible to suppress any increase in the rotation resistance of the radial ball bearing, while at the same time suppress misalignment of the center axis of the inner race of the radial ball bearing from the center axis of the outer race. In other words, the amount of offset of the winding position of the endless belt from the center of the radial ball bearing is kept to 40% or less of the diameter of the pitch circle of the radial ball bearing, so that it is possible to keep moment loads applied to the outer race by way of the pulley to a minimum.

This makes it possible to suppress tilting of the pulley and outer race with respect to the inner race, as well as makes it possible to prevent excessive surface pressure from occurring in the rolling contact portion of the radial ball bearing, thus making it possible to secure the durability of the radial ball bearing. In addition, it is possible to keep eccentric wear of the endless belt that extends around the pulley to a minimum, making it possible to secure the durability of the endless belt.

Moreover, by keeping the radial clearance of the radial ball bearing upon standalone 0.2% or less of the diameter of the pitch circle of the radial ball bearing, or 1.5% or less of the diameter of the balls, it becomes more difficult for the concentric center axes to become misaligned, and improved operation is obtained.

Furthermore, when necessary, by adding one or two or more of the items 1 thru 5 above, it is possible to further improve the durability of the radial ball bearing.

First, by securing the groove depth of the inner and outer raceways to 18% or more of the diameter of the balls as described in item (1), it is possible to prevent the rolling surface of the balls from moving onto the edge of the inner-ring raceway or outer-ring raceway, and it is possible to prevent excessive surface pressure from being applied to the rolling surface, thus making it possible to secure the rolling fatigue life of the rolling surface and improve the durability of the radial ball bearing.

Moreover, by filling the bearing with grease having a composition as specified in item (2) above, it is possible to improve the life of the grease, and thus it is possible to improve the durability of the radial ball bearing.

Also, by performing nitriding or dimension stabilization as described in item (3) above, it is possible to improve the rolling fatigue life of the treated parts, as well as the other parts that come in contact with the treated parts, and thus it is possible to improve the durability of the radial ball bearing.

Moreover, by securing the internal dimension of the retainer pockets, it is possible to prevent the balls in the pockets from strongly pressing against the inner surface of the pockets, and thus it is possible to prevent damage to the retainer and to improve the durability of the radial ball bearing, which includes this retainer.

Furthermore, by securing the width dimension of the cross section of the radial ball bearing as described in item (5) above, it is possible to increase volume of the space inside the radial ball bearing and the amount of grease that can be filled into that space, and as a result it is possible to lengthen the life of the grease and improve the durability of the radial ball bearing.

As can be seen from the explanation above, the construction of the items (1) thru (5) above can be applied separately or arbitrarily combined and applied to the rotation support apparatus for compressor pulley of this invention. Furthermore, these items can be applied to a single-row ball bearing, regardless of whether it is a radial ball bearing of the 3-point contact type or 4-point contact type, independently (separately) from the rotation support apparatus for compressor pulley of this invention. In this case as well, the construction of items (1) thru (5) above can be applied separately or arbitrarily combined.

Now, the present invention is explained on the embodiments referring to the attached drawing.

Figure 1:
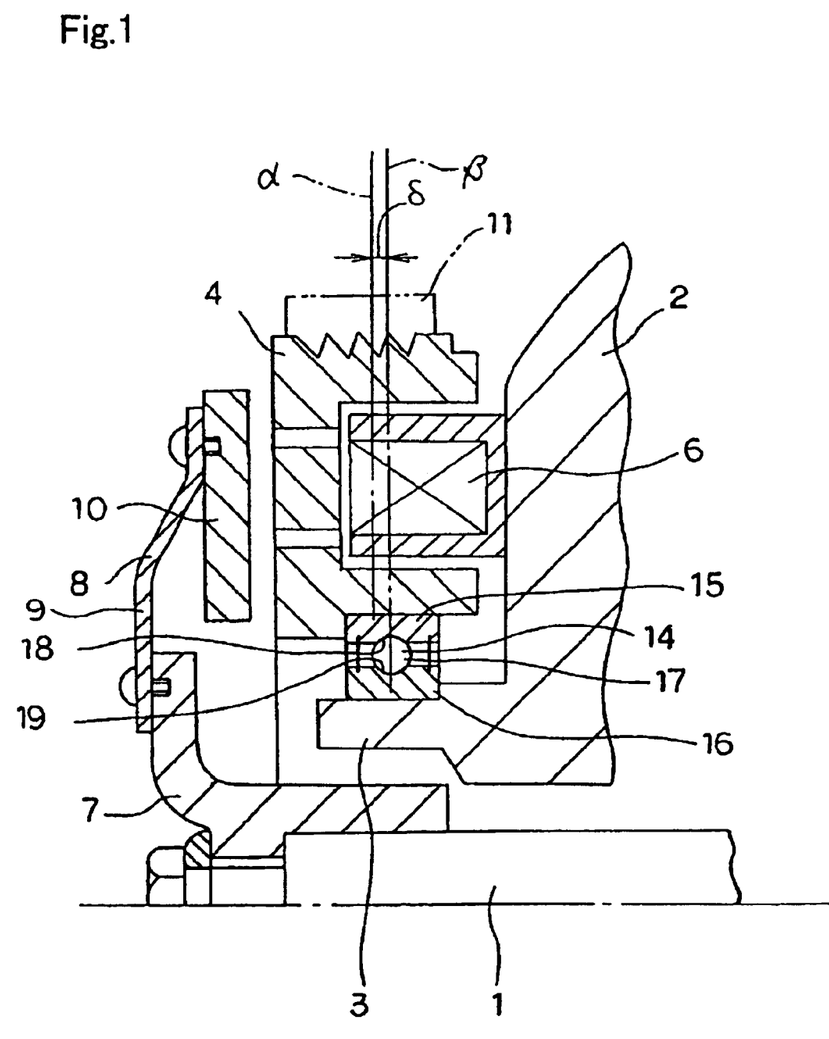
FIG. 1 is a cross sectional view of a portion of one example of the embodiment of the present invention.
Figure 2:
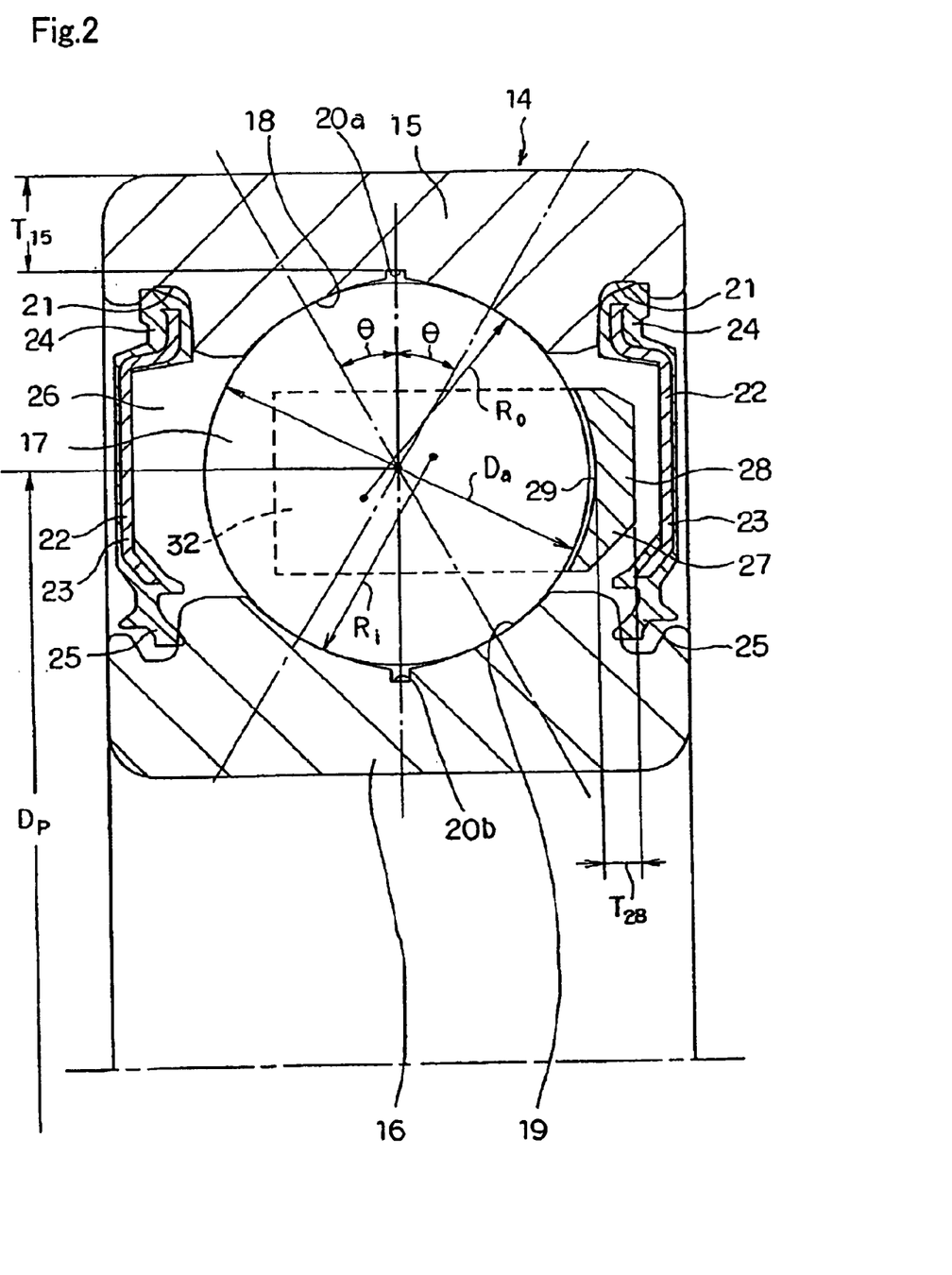
FIG. 2 is an enlarged cross sectional view of the radial ball bearing taken out of the example of FIG. 1.

FIG. 1 and FIG. 2 show a first example of the embodiment of the invention. This embodiment is characterized by construction of using a 4-point contact type radial ball bearing 14 as the roller bearing for rotation support of the follower pulley 4 around the stationary support section such as the support cylinder 3 of the casing 2, and by properly regulating the positional relationship between the radial ball bearing 14 and follower pulley 4 by the relationship with the dimensions of this radial ball bearing 14, it is possible to secure the durability of the radial ball bearing 14 and the endless belt 11, which extends around the follower pulley 4. The construction and function of the other parts are substantially the same as in the prior construction shown in FIG. 7 and described above, so the same symbols will be used for like parts, and any redundant explanation will be omitted or simplified, and this explanation will center on the characteristic parts of this embodiment.

The aforementioned radial ball bearing 14 comprises an outer race 15 and inner race 16, which are supported such that they are concentric with each other, and a plurality of balls 17. There is an outer-ring raceway 18 formed around the inner peripheral surface of the outer race 15, and an inner-ring raceway 19 formed around the outer peripheral surface of the inner race 16. The cross section of these ring raceways 18, 19 is a gothic arches shape with a pair of two arcs that intersect in the middle of the arcs and which have different centers and radii of curvature Ro, Ri that are more than ½ of the diameter Da of the balls 17. In this example, the radius of curvature Ro of the outer-ring raceway 18 is 0.53 times the diameter Da of the balls 17 (Ro=0.53 Da), and the radius of curvature Ri of the inner-ring raceway 19 is 0.515 times the diameter Da of the balls 17 (Ri=0.515 Da).

With the construction described above, the ring raceways 18, 19 both come in contact with the rolling surface of the ball 17 at two points for a total of four contact points for each ball 17. In this example, the rest angle θ, which indicates the positions of the rolling contact sections between the raceways 18, 19 and the rolling surface of the ball 17 by way of the displacement angle from the center of the raceways 18, 19, are each 20 degrees.

Also, when the radial ball bearing 14 is assembled with the aforementioned outer race 15, inner race 16 and balls 17, there is positive or negative radial clearance in the radial ball bearing 14, however, even when there is positive clearance, that value is kept to 0.2% or less of the diameter Dp of the pitch circle of the radial ball bearing 14, or 1.5% or less of the diameter Da of the balls 17.

The reason that the radius of curvature Ro of the outer-ring raceway 18 is made larger than the radius of curvature Ri of the inner-ring raceway 19 is that the convex-concave shape with respect to the circumferential direction of the raceways 18, 19 becomes opposite for the outer-ring raceway 18 and inner-ring raceway 19. In other words, by making the radius of curvature Ro of the outer-ring raceway 18 which has a concave shape with respect to the circumferential direction, larger than the radius of curvature Ri of the inner-ring raceway 19 which has a convex shape with respect to the circumferential direction, there is no large difference in contact area and contact pressure of the contact sections and the rolling fatigue lives of the races 18, 19 are matched, so design is simplified.

Moreover, depending on the operating conditions, high-temperature tempering in the temperature range of 190° C. to 230° C. or 230° C. to 270° C. is performed for the outer race 15 and inner race 16, in order to improve the rolling fatigue life of the raceways 18, 19. When high-temperature tempering is actually performed, it is performed within a temperature range at nominal values of 200° C., 210° C., 220° C., 240° C., or 260° C. as targets.

In the example shown in the figures, in the centers in the width direction of the raceways 18, 19, escape grooves 20a, 20b are formed in order to prevent interference with the tools used when processing the raceways 18, 19. However, these escape grooves 20a, 20b can be omitted as in the case of the prior construction previously described and shown in FIG. 9.

In any case, the material thickness $T_{15}$ of the bottom section of the groove (part in the center of the outer-ring raceway 18 with the smallest thickness) in the outer race 15 is 20% or more, and preferably 20 to 40% of the diameter Da of the balls 17 $\{T_{15}=(0.2 \text{ to } 0.4)Da\}$. When the escape groove 20a is formed, the material thickness $T_{15}$ is the distance between the bottom section of the escape groove 20a and the outer peripheral surface of the outer race 15. By regulating this material thickness $T_{15}$ within the aforementioned range, it is possible to prevent useless increase in the diameter of the radial ball bearing 14, and thus it is possible to prevent increasing the size of the radial ball bearing 14, which contains the outer race 15, and secure the strength of the outer race 15.

Figure 3:
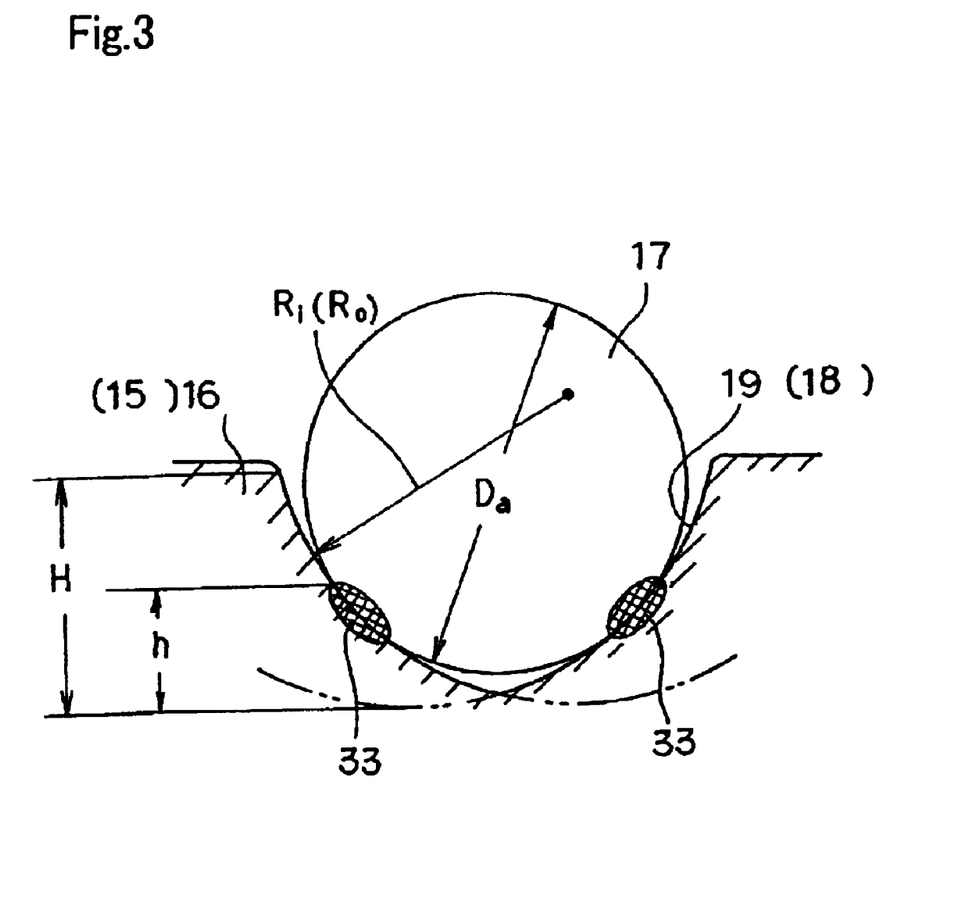
FIG. 3 is a cross sectional view of a portion of the raceway with a ball thereon to explain the concept of the groove depth.

It is also preferable that the groove depth of the inner-ring raceway 19 and outer-ring raceway 18 be 18% or more of the diameter Da of the balls 17. As shown in FIG. 3, the groove depth of the inner-ring raceway 19 and outer-ring raceway 18 of a 4-point contact type radial ball bearing is the distance H from the curved bottom section, having the aforementioned radius of curvature Ri (Ro), to the edges of the inner-ring raceway 19 and outer-ring raceway 18 (in the case of chamfered edges, it is the distance to the chamfered section). By making this groove depth H 18% or more of the diameter Da of the balls 17, it is possible to prevent the rolling surface of the balls 17 from riding up on the edges of the inner-ring raceway 19 and outer-ring raceway 18, and prevent large surface pressure from being applied to the rolling surface, and thus it is possible to secure the rolling fatigue life of the rolling surfaces and improve the durability of the radial ball bearing 14. The reason for this will be explained used FIG. 3 and FIG. 4.

There is a pair of well known contact ellipses 33 formed at the contact sections between the rolling surface of the balls 17 and the inner-ring raceway 19 and outer-ring raceway 18, on the left and right (left and right direction of FIG. 3) of the raceways 18, 19, however, the size of these contact ellipses 33 varies according to the size of the radial load or moment load applied to the radial ball bearing 14. When a moment load is applied, the sizes of the pair of contact ellipses 33 differ from each other.

In any case, when the contact ellipses 33 exist entirely in the section of the inner-ring raceway 19 and outer-ring raceway 18, excessively large surface pressure is not applied to the rolling surface of the balls 17, however, when either of the contact ellipses 33 become separated from the inner-ring raceway 18 or outer-ring raceway 19 (strictly speaking, when the ellipses becomes separated, they are no longer contact ellipses, but in order to simplify the explanation, the term "contact ellipse" will be used here even when the area of contact reaches the edges), very large pressure forces act on the rolling surfaces due to edge loading.

Moreover, in order to secure the rolling fatigue life of the rolling surface of the balls 17 and the durability of the radial ball bearing 14, it is necessary that the contact ellipses 33 do not become separated from the inner-ring raceway 19 or outer-ring raceway 18, or in other words, it is necessary that the contact ellipses 33 do not reach the edges of the ring raceways 19, 18.

Therefore, the inventors performed experiments to find the relationship between the effective radial clearance and height of the contact ellipses 33 for a 4-point contact type radial ball bearing 14 that is being operated under moment loading. The experiments were performed using the specifications as described above using FIG. 2, where a 1,000 N radial load was applied to a radial ball bearing 14 having a pitch-circle diameter Dp of 43.5 mm, at an offset amount of 8.7 mm (in FIG. 1, δ=8.7 mm, δ/D=0.2=20%), and the change in height of the contact ellipses 33 due to fluctuation of the effective radial clearance was found.

The contact ellipses 33 existed at 4 points for each ball 17 of the 4-point contact type radial ball bearing 14, however, of these, the height h of the edge section of the contact ellipse 33 that reached nearest to the edge section of the raceways was taken to be the height of the contact ellipse 33 of the radial ball bearing 14. Also, the relationship between the ratio (h/Da) of this height h with respect to the diameter Da of the balls 17, and the effective radial clearance was found.

Figure 4:
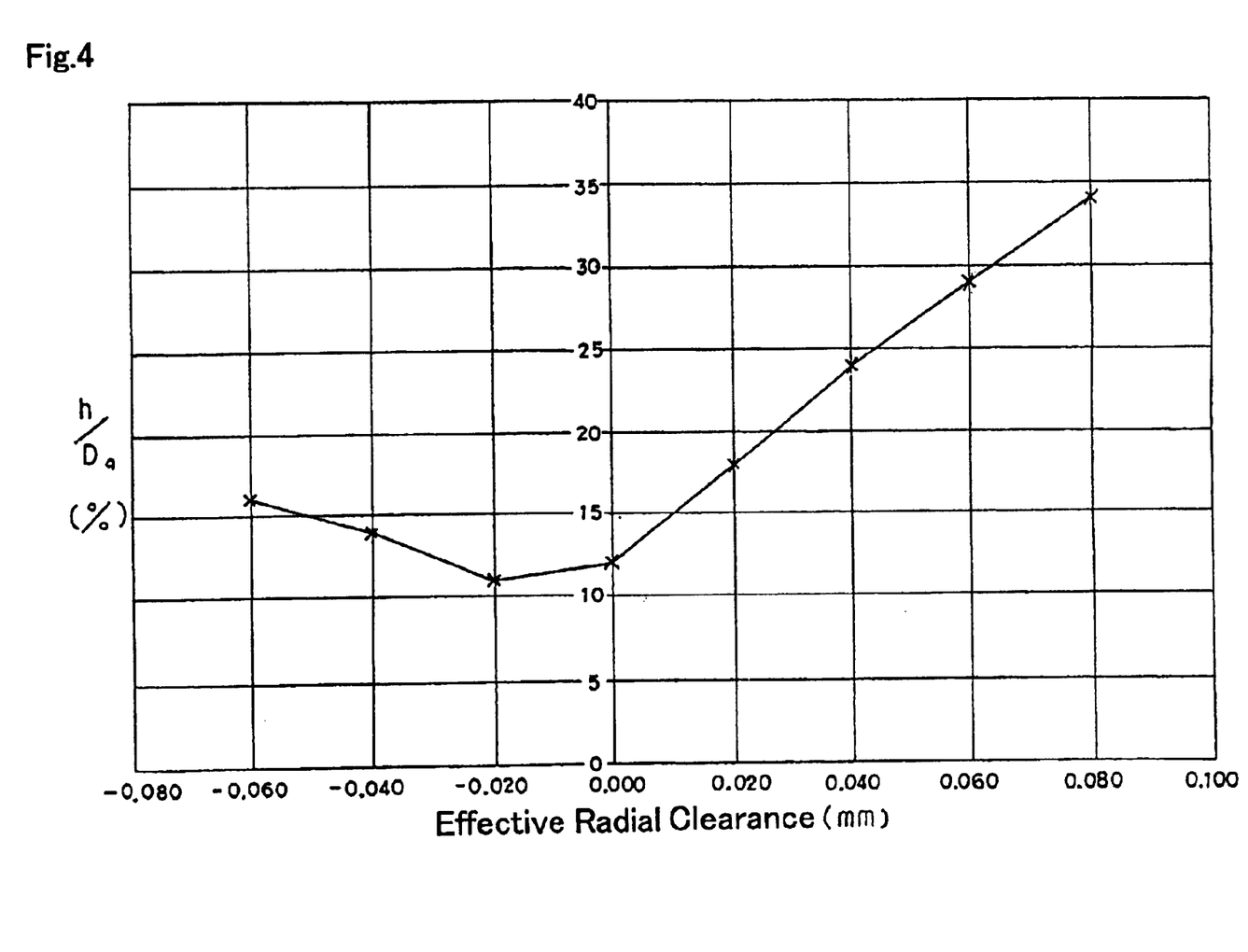
FIG. 4 is a diagram to show a relation between the effective radial clearance and the height of the contact ellipse.

The results of the experiments are shown in FIG. 4. The 4-point contact type radial ball bearing 14 that is assembled in the rotation support section of the pulley for compressor to which this invention is directed is used under temperature conditions of −40° C. to 160° C., and the effective radial clearance of the radial ball bearing 14 in this case is in the range from −0.010 mm (negative clearance) to 0.020 mm (positive clearance). In this range, the height h of the contact ellipse 33 is the highest since the effective radial clearance is the greatest, and when the effective radial clearance is 0.020 mm, the ratio (h/Da) of the height h of the contact ellipse 33 with respect to the diameter Da of the balls 17 was 18%.

From this result, it can be seen that as described in item (1) above, when the groove depth H of the inner-ring raceway 19 and outer-ring raceway 18 is secured at 18% or more of the diameter Da of the balls 17, it is possible to prevent the rolling surface of the balls 17 from riding up on the edges of the inner-ring raceway 19 and outer-ring raceway 18. By preventing the rolling surface from riding up on the edges, it is possible to prevent excessively large surface pressure from being applied to the rolling surface of the balls 17, and thus making it possible to secure the rolling fatigue life of the rolling surface and improve the durability of the radial ball bearing 14. Taking into consideration the work of assembling the balls 17 in between the inner-ring raceway 19 and outer-ring raceway 18, the maximum value of the ratio (H/Da) of the groove depth H with respect to the diameter Da of the balls 17 is taken to be 40% or less.

This technique of improving the durability of the radial ball bearing 14 by keeping the groove depth H of the inner-ring raceway 19 and outer-ring raceway 18 at 18% or more of the diameter Da of the balls 17, can of course be combined with this invention, directed to the compressor pulley rotation support section as well as applied to other uses.

Moreover, as shown in FIG. 2, an attachment groove 21 is formed around the inner peripheral surface on both ends of the outer race 15, in which the outer peripheral edges of seal rings 22 are fastened. These seal rings 22 comprise an elastic material 24, which is reinforced by a metal core 23, and the outer peripheral edge of the elastic material 24 are fitted elastically inside the aforementioned attachment grooves 21. In this state, the tip of the edge of a seal lip 25 that is formed on the inner peripheral edge of the elastic material 24 comes in sliding contact all the way around a section of the inner race 16, and seals both openings of the internal space 26 where the balls 17 are located. It is preferable for nitrile rubber or acrylic rubber to be used for the elastic material 24 of the seal rings 22.

The internal space 26 is sheltered from the outside in this way, and then as described for item (2) above, an ether-family grease (not shown in the figure) having a viscosity of 70 to 90 mm$^2$/s (cst) and preferably 77 to 82 mm$^2$/s, is filled in the space at a temperature of 40° C. It is preferable for this grease to be a synthetic oil having ether-family oil as the base oil, and to contain a urea thickening agent such as diurea, and at least Ba, Zn and ZnDTC (extreme-pressure additive Zinc Dithiocarbamate) as additives. This kind of grease forms an oil film on the rolling contact surfaces of the balls 17 and raceways 18, 19, which contributes to securing of the rolling fatigue life of the raceways 18, 19. In other words, when the inside of the radial ball bearing 14 becomes hot due to operation under conditions of a large offset load, the life of the grease filled in the internal space 26 is shortened due to thermal degradation. Grease having the composition described above has superior thermal resistance, so the life of the grease drop very little due to rise in temperature inside the internal space 26, which contributes to the improvement of durability of the radial ball bearing 14. In addition to grease having the composition described above, it is also possible to fill the internal space 26 with a grease having an ester-family or polyolefin-family synthetic oil as the base oil.

In this example of the invention, the balls 17 are held by a crown-shaped retainer or cage 27 such that they can rotate freely. This retainer 27 is formed into a single piece by injection molding of a synthetic resin such as polyamide resin or polyphenylene sulfide resin which contains 5 to 35% by weight (preferably 10 to 25% by weight) glass fiber as a reinforcement material.

The thickness $T_{28}$ in the axial direction of the bottom section of this retainer 27, or in other words, the portion of the circular rim section 28 that is the thinnest and which corresponds to the innermost portion of the pockets 29, is 10 to 40% of the diameter Da of the rolling balls 17 {$T_{28}$ =(0.1 to 0.4) Da}. By regulating the dimensions of the retainer 27 as described above, it is possible to keep any increase in the dimensions in the radial direction of the retainer 27 to a minimum, while at the same time securing the strength of the retainer 27, and regardless of centrifugal force that is applied when the follower pulley 4 is rotating at high speed, it is possible to keep elastic deformation of this retainer 27 within an amount that causes no practical problems.

Moreover, it is preferable that the internal dimension of the pockets 29 in the circumferential direction (front and rear in FIGS. 1 and 2) of the retainer 27 be 1.03 times or more the diameter Da of the balls 17. By securing the internal dimension of the pockets 29 of the retainer 27 in this way, it is possible to prevent strong pressing forces from acting on the inner surface of the pockets 29 by balls 17 that are held inside the pockets 29, and this it is possible to prevent damage to the retainer 27 and to improve the durability of the radial ball bearing 14 that includes this retainer 27. The reason for this will be explained using FIG. 5.

Figure 5:
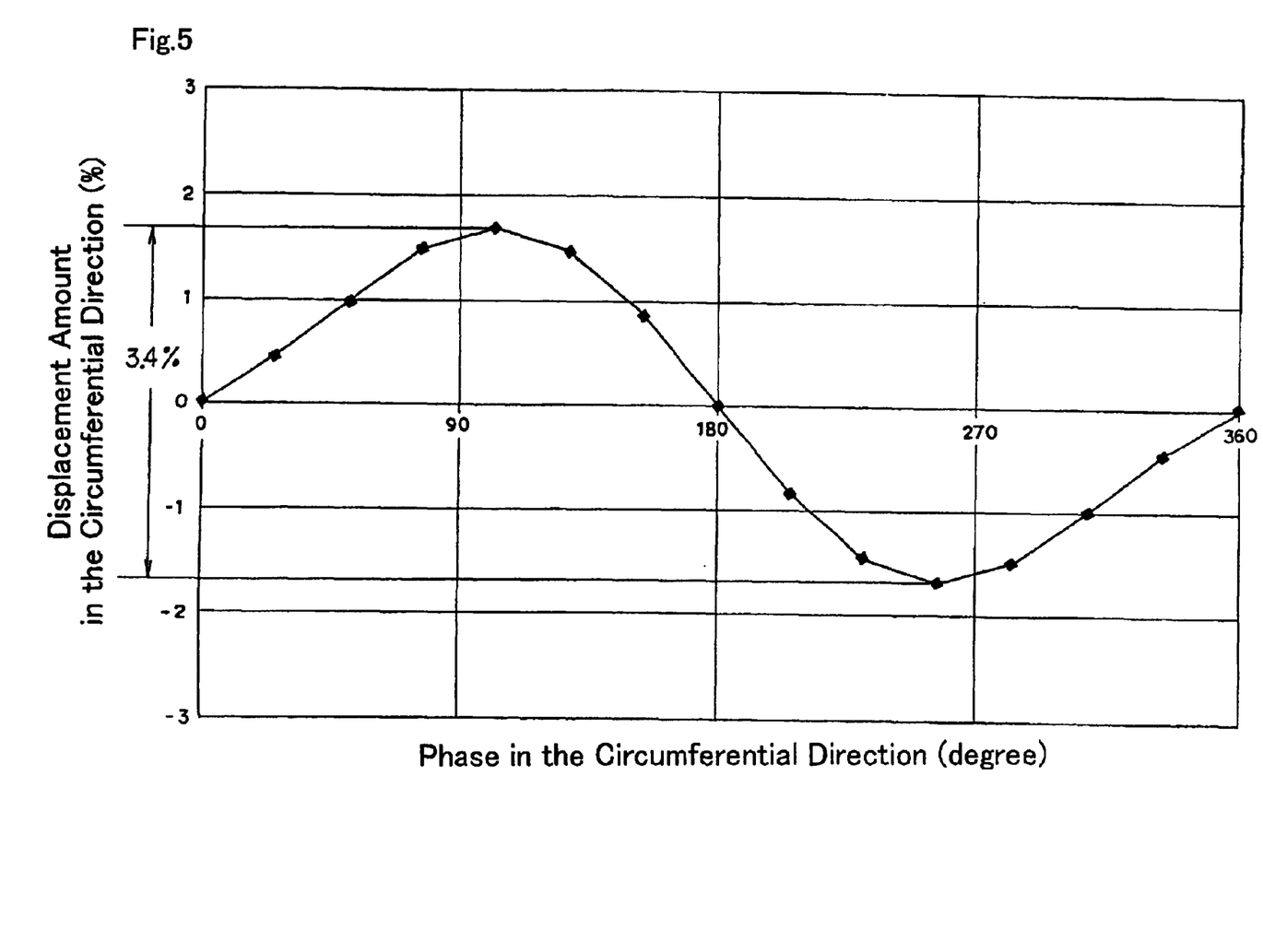
FIG. 5 is a diagram to show a relation between the displacement amount of ball from the normal position and the circumferential position.

The aforementioned retainer 27 rotates as the balls 17 revolve, however, the revolution speed of the balls 17 are affected by the contact angle with the outer-ring raceway 18 and inner-ring raceway 19. Also, when the radial ball bearing 14 rotates in a state of moment loading, the contact angle with the balls 17 changes a little in the circumferential direction of the outer-ring raceway 18 and inner-ring raceway 19.

As a result, the revolution speed of the balls 17 becomes non-uniform in this circumferential direction. In other words, the speed slightly increases or decreases depending on the phase in the circumferential direction. As a result, the position of the balls 17 in the circumferential direction slightly changes with reference to the normal position in the case where the revolution of the balls 17 was uniform (no change in revolution speed in the circumferential direction).

FIG. 5 shows the ratio of the displacement of the balls 17 from the normal position with respect to the diameter Da of the balls 17 when the radial ball bearing 14a is rotating under moment loading. The abscissa in FIG. 5 represents the position in the circumferential direction by the angle, and the ordinate represents the ratio of the displacement from the normal position with respect to the diameter Da of the balls.

As can be clearly seen from FIG. 5, while the balls 17 are revolving one rotation, they move forward or backward about ±1.7% in the direction of rotation around the normal position. As a result, when the rolling surfaces of the balls 17 come near the inner surface of the pockets 29, the balls 17 that are revolving quickly press against the front inner surface of the pockets 29 in the direction of revolution, and similarly, the balls 17 that are revolving slowly press against the rear inner surface. Therefore, large forces are applied to the tab section 32 (see FIG. 2) that exists between a pair of adjacent pockets 29 in the circumferential direction, such that the direction of the force alternates in the circumferential direction, and thus durability of the retainer 27, which includes this tab section 32, is lost.

In contrast to this, if the inner dimension of the pockets 29 in the circumferential direction of the retainer 27 is made 1.03 times or more the diameter Da of the balls 17 as described above, it is possible to prevent the balls 17 that are held in these pockets 29 from strongly pressing against the inner surface of these pockets 29. When the inner dimension is 1.03 times the diameter Da, there is a possibility that the rolling surface of the balls 17 is pressed against the inner surface of the pockets 29, however, the amount is extremely small and can be sufficiently absorbed through elastic deformation of the tab section 32 with no problem. Furthermore, by making the inner dimension 1.035 times or more the diameter Da, it is possible to, sufficiently prevent the rolling surfaces of the balls 17 from being pressed the inner surface of the pockets 29.

In order to increase the internal dimension of the pockets 29 in the circumferential direction of the retainer 27, the entire inner diameter of the pockets 29 can be increased, or it is possible to form the pockets 29 in an oval shape that is longer in the circumferential direction.

In either case, the maximum value of the internal dimension in the circumferential direction is, taking into consideration the overall strength of the retainer 27, regulated by the relationship with the diameter Da. Normally, the maximum value of the inner dimension is regulated to be 1.1 times or less, or preferably, 1.05 times or less the diameter Da.

Also, this technique of improving the durability of the retainer by increasing the internal dimension of the pockets 29 in the circumferential direction is not limited to the crown shaped retainer shown in the figure, but can also be applied to machined cages or retainers having a rim section on both ends in the axial direction. Furthermore, the technique can of course be applied to this invention which is directed to the rotation support apparatus for the compressor pulley as well as other uses for practicing the present invention.

As shown in FIG. 1, the radial ball bearing 14 constructed as described above is installed between the inner peripheral surface of the follower pulley 4 and the support cylinder 3 of the casing 2 to form the rotation support apparatus for compressor pulley of this invention. When the rotation support apparatus for compressor pulley is constructed in this way, the center position (shown by the dot-dash line α in FIG. 1) in the width direction of the endless belt 11 that extends around the outer peripheral surface of the follower pulley 4, and the center position (shown by the dot-dash line β in FIG. 1), and the center of the ball 17) in the width direction of the radial ball bearing 14 are displaced in the axial direction (left and right direction in FIG. 1) by the amount δ (offset amount) shown in FIG. 1. In the case of the rotation support apparatus for compressor pulley of this invention, the aforementioned offset amount δ is 40% or less of the diameter Dp of the pitch circle of the radial ball bearing 14 (see FIG. 2) (0.4 Dp≧δ). Preferably, this offset amount should be 20% or less (0.2 Dp≧δ), or even more preferably 10% or less (0.1 Dp≧δ) of the diameter Dp of the pitch circle, in order to secure the durability of the radial ball bearing 14.

Figure 6:
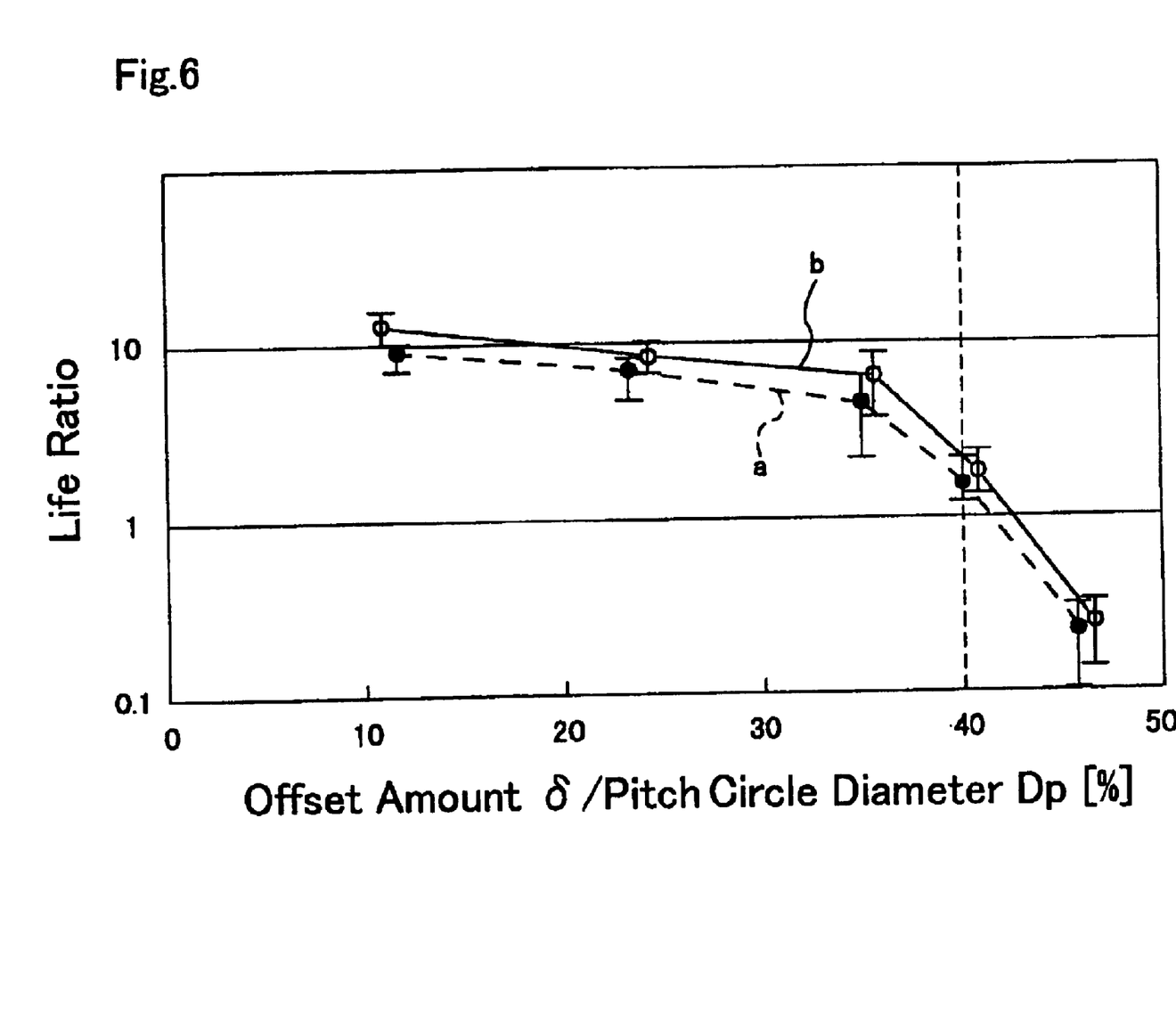
FIG. 6 is a diagram to show a result of durability tests which is conducted to know about the effects of the ratio of the offset amount to the diameter of the pitch circle on the durability.

This point will be further explained with reference to FIG. 6, which shows the results of experiments performed by the inventors. FIG. 6 is a graph showing the results of endurance tests that were performed in order to find out the effect that the ratio (δ/Dp) of the offset amount δ of the acting position of the radial load from the center of the radial ball bearing 14 (center of each ball 17), with respect to the diameter Dp of the pitch circle of the balls 17 of the radial ball bearing 14 has on the life of the radial ball bearing 14. FIG. 6 shows the ratio (δ/Dp) of the offset amount δ and the diameter Dp of the pitch circle along the abscissa, and shows the life ratio (dimensionless number) on the ordinate.

The life ratio that is shown on the ordinate shows that 1 is the life necessary for practical use, and when this life ratio is 1 or greater, then the construction can withstand practical use, however, when this life ratio is less than 1, then the construction cannot withstand practical use. This life ratio is found under the following conditions by operating the radial ball bearing 14 with the inner race 16 fixed and rotating the outer race 15.

Rpm: 10,000 rpm
Temperature: Normal room temperature
Radial load: 2,254 N

The inventors changed the offset amount δ five times within the range 11.5% to 46% and measured the life (durability) at each for a plurality of specimens. The vertical lines along the dashed line 'a' in FIG. 6 that correspond to the five offset amounts δ show the range of variation in the test results for the plurality of specimens, and the black dots on these vertical lines show the average values of these specimens.

As can be seen from the test results shown in FIG. 6, when the offset value δ is kept at 40% or less of the diameter Dp of the pitch circle of the radial ball bearing 14, it is possible to realize a construction which is capable of withstanding practical use securing the life necessary for practical use.

However, in contrast to this, when the offset value δ exceeds 40% of the diameter Dp of the pitch circle of the radial ball bearing 14, the durability of the radial ball bearing 14 rapidly worsens. Moreover, when the offset value δ is kept to 20% or less of the diameter Dp of the pitch circle, it is possible to secure the life of the radial ball bearing 14 at 8 times or more the value necessary for practical use. Furthermore, when the offset value δ is kept at 10% or less of the pitch-circle diameter Dp, it is possible to secure the life of the radial ball bearing 14 at about 10 times the value necessary for practical use.

When using this kind of rotation support for compressor pulley, moment loads that are proportional to the aforementioned offset amount δ are applied to the radial ball bearing 14 by way of the follower pulley 4 due to the tension of the endless belt 11. In addition, the center axis of the outer race 15 and the center axis of the inner race 16 of the radial ball bearing 14 have a tendency to become misaligned (to tilt). However, in the case of this invention, even in this kind of case, it is possible to suppress any increase in resistance to rotation of the radial ball bearing 14, while at the same time, suppress misalignment of the center axis of the outer race 15 and the center axis of the inner race 16 of the radial ball bearing 14.

In other words, the radial clearance for a standalone radial ball bearing 14 is kept at 0.2% or less of the pitch-circle diameter Dp of the radial ball bearing 14, or 1.5% or less of the diameter Da of the balls 17, so it is difficult for the aforementioned center axes to become misaligned. Also, the offset amount of the winding position of the endless belt 11 with respect to the radial ball bearing 14 is kept at 40% or less, or preferably 20% or less, and even more preferably 10% or less of the pitch-circle diameter Dp, so it is possible to keep the moment load applied to the outer race 15 by way of the follower pulley 4 small.

This makes it possible to suppress tilting of the follower pulley 4 and outer race 15 with respect to the inner race 16 and to prevent excessively large surface pressure from acting on the areas of rolling contact in radial ball bearing 14, and makes it possible to secure the durability of the radial ball bearing 14. Moreover, it makes it possible to prevent eccentric wear of the endless belt 11 that extends around the follower pulley 4 and to secure the durability of the endless belt 11.

In order to prevent misalignment of the aforementioned center axes and to remove the moment load caused by that misalignment, the offset amount δ is made zero, or in other words, matching the center position α in the axial direction of the position where the endless belt 11 is wound around the outer peripheral surface of the follower pulley 4, with the center position β in the axial direction of the radial ball bearing 14 is considered to be possible.

However, by doing this, it becomes easy for wear and heat to occur due to slipping at the contact points between the rolling surface of the balls 17 and the outer-ring raceway 18 and inner-ring raceway 19. That is, when the offset amount δ is made zero in order to remove the moment load, the surface pressure at the four contact points, two points of contact each between the rolling surface of the balls 17 and the outer-ring raceway 18 and inner-ring raceway 19, becomes nearly the same on both sides in the axial direction. When the follower pulley 4 rotates in this state, it becomes easy for large slippage to occur at these points of contact, and thus it becomes easy for heat to be generated in the radial ball bearing 14. In addition, as heat is generated, there is a possibility that the rolling fatigue life of the radial ball bearing 14 will decrease.

In consideration of the above problems, with this invention it is possible to make the minimum value of the offset amount δ 1 mm or more (δ≧1 mm). By making the minimum value of this offset amount δ 1 mm or more, a pressure difference in surface pressure at the contact points on both sides in the axial direction is formed, and this makes it possible to prevent the occurrence of large slippage at the contact points and makes it possible to lengthen the rolling fatigue life of the radial ball bearing 14.

The explanation above, is made on an embodiment of a radial ball bearing 14 of the 4-point contact type in which the rolling surface of the balls 17 comes in contact with the outer-ring raceway 18 and inner-ring raceway 19 at two points each for a total of four points, however, as shown in FIG. 10, similar results can also be obtained for a radial ball bearing 14 of the 3-point contact type in which the rolling surface of the balls 17 comes in contact with the inner-ring raceway 19 at one point, and the outer-ring raceway 18 at 2 points.

The inventors found the relationship between the offset amount and the life ratio for this kind of radial ball bearing of the 3-point contact type as well. The test results of these experiments are shown in FIG. 6 together with the results for the 4-point contact radial ball bearing 14. The vertical lines along the dashed line 'b' in FIG. 6 that correspond to the five offset amounts 6 show the range of variation in the test results for the plurality of specimens for a radial ball bearing 14 of the 3-point contact type, and the white dots on these vertical lines show the average values of the specimens.

As can be seen from the test results shown in FIG. 6, in the case of the radial ball bearing 14 of the 3-point contact as well, when the offset amount δ is kept to 40% or less of the pitch-circle diameter Dp of the radial ball bearing, construction that secures the life necessary for practical use, and which is capable of withstanding practical use is possible. However, in contrast to this, when the offset value δ exceeds 40% of the diameter Dp of the pitch circle of the radial ball bearing 14, the durability of the radial ball bearing 14 rapidly worsens. Moreover, when the offset value δ is kept to 20% or less of the diameter Dp of the pitch circle, it is possible to secure the life of the radial ball bearing 14 at 12 times or more the value necessary for practical use. Furthermore, when the offset value δ is kept at 10% or less of the pitch-circle diameter Dp, it is possible to secure the life of the radial ball bearing 14 at about 13 times the value necessary for practical use. As can be clearly seen from FIG. 6, when comparing the lives of the radial ball bearings, the life of the 3-point contact type radial ball bearing 14 is longer than the life of the 4-point contact type radial ball bearing 14.

However, in regards to the inclination angle of the follower pulley when a moment load is applied to the follower pulley that is supported by the ball bearing 14, the inclination angle of the follower pulley that is supported by the 3-point contact type ball bearing 14 is larger than the inclination angle of the follower pulley that is supported by the 4-point contact type ball bearing 14. Also, the life of the endless belt that extends around the follower pulley that is supported by the 3-point contact type ball bearing 14 is shorter than the life of the endless belt that extends around the follower pulley that is supported by the 4-point contact type ball bearing 14. Therefore, in an actual case, depending on the use, the balance between the life of the radial ball bearing 14 and the life of the endless belt is taken into consideration in selecting whether to use the 3-point contact type or 4-point contact type for the radial ball bearing 14.

Furthermore, the invention described above was applied to construction having an electromagnetic clutch for engaging or disengaging the pulley and rotating shaft, however, as long as the construction allows for rotation force to be freely transmitted from the pulley to the rotating shaft, the invention can also be applied to construction not having an electromagnetic clutch. In other words, in the case of a swashplate-type variable displacement compressor as disclosed in Japanese Patent Publication No. Tokukai Hei 11-210619 or Jitsukai Sho 64-27482, by making the inclination angle of the swashplate small (or furthermore zero), it is possible to make the rotation torque of the rotating shaft of the compressor very small.

Figure 11:
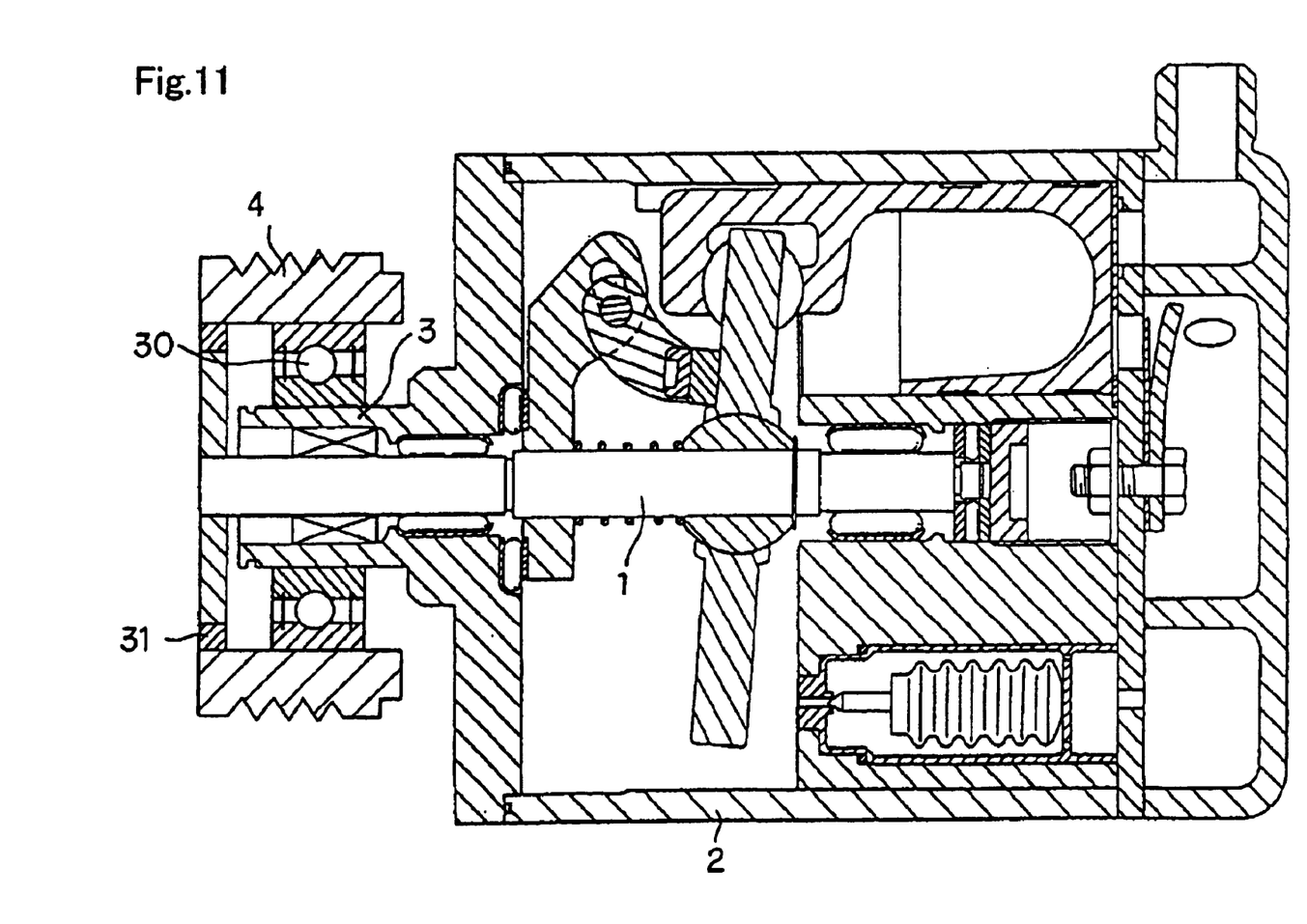
FIG. 11 is a cross sectional view to show another example of the construction to which the present invention is applied.

In the case of this construction, as shown in FIG. 11, there is also the case of connecting the follower pulley 4, which is rotatably supported by the rolling bearing 30 around the support cylinder section 3 that is formed on the end of the casing 2, to the rotating shaft 1 by way of a cushioning material 31 that functions as a torque tube, such that rotation force can be freely transmitted as long as no excessive torque is applied, in which case there is no electromagnetic clutch.

With this construction, a single-row 3-point contact type or 4-point contact type of the radial ball bearing, as shown in the figure, is used as the rolling bearing 30, and by regulating the relationship between the position of the rolling bearing 30 and the follower pulley 4 as shown in FIG. 1, it is possible to obtain the function and effect of this invention. This construction is also part of this invention. When the present invention is applied to this kind of construction, the specifications of the components of the rolling bearing 30 of the 3-point contact type or 4-point contact type, and the positional relationship of the rolling bearing 30 and follower pulley 4 are the same as shown in FIG. 1 and FIG. 2.

Also, in the case that at least one member of the inner races 16, outer races 15 and balls 17 (see FIGS. 1, 2 and 10) of the radial ball bearings 14 and rolling bearing 30, is made of steel, such as carbon steel, bearing steel or stainless steel, then it is preferred that at least one of these members 16, 15, 17, is treated by either nitriding or dimension stabilization, to secure the durability of the radial ball bearings 14 or rolling bearing 30.

In other words, when a single-row ball bearing such as the radial ball bearing 14 or rolling bearing 30 is operated with an offset load applied, the surface pressure at the areas of contact between the rolling surface of the balls 17 and the inner-ring raceway 19 and outer-ring raceway 18 becomes high. When elastic deformation becomes large due to this surface pressure, the rolling fatigue life of the members and therefore the durability of the radial ball bearing 14 or rolling bearing 30 decreases, so by performing nitriding it is possible to increase the surface hardness of the members, and thus it is possible to suppress elastic deformation and prevent wear.

Moreover, during operation under offset loading, the amount of heat generated increases, and thus it becomes easy for the dimensions of the components of the radial ball bearing 14 or rolling bearing 30 to change, so by performing dimension stabilization, it is possible to suppress changes in dimensions regardless of the generation of heat.

Of these, nitriding is a process of hardening the surface layer with a solid solution of C and N, and the hardness of the surface increases after treatment.

By performing nitriding, there is a very hard nitride layer on the surfaces of the inner race 16, outer race 15 and balls 17. In regards to the inner race 16, and outer race 15, when there is a nitride layer on the inner-ring raceway 19 or outer-ring raceway 18, there is no need for nitriding of other areas. However, since it is troublesome to form a nitride layer on just the portion of the inner-ring raceway 19 or outer-ring raceway 18, so in an actual case, it is preferred to for a nitride layer over the entire surface of the inner race 16 and outer race 15.

The elastic deformation due to the surface pressure does not occur the same for the inner race 16, outer race 15 or balls 17, and differs depending on the shape and material. For example, when the material is the same, it is easy for elastic deformation of the outer-ring raceway 18 and inner-ring raceway 19 to occur, however, difficult for elastic deformation of the rolling surface of the balls 17 to occur. Also, it is preferred that nitriding be performed for all of the members, however, depending on the material, dimensions or shape, it is possible to perform it for only part, such as the inner race 16 and outer race 15.

Moreover, the aforementioned dimension stabilization is a heat treatment for the purpose of reducing the amount of residual austenite $\gamma R$, wherein for example, by gradually cooling the material used for manufacturing the inner race 16 and outer race 15, the residual amount of austenite $\gamma R$ is reduced to 6% or less by volume. By performing this kind of dimension stabilization it is possible to prevent the dimensions and shape of the component materials from changing much from the normal value even when the temperature of the component materials of the radial ball bearing 14 or rolling bearing 30 increases, as well as it is possible to prevent the radial ball bearing 14 or rolling bearing 30 from changing from the normal state, and thus it is possible to improve the durability of the bearings 14, 30.

This nitriding or dimension stabilization can of course be performed for the compressor pulley rotation support apparatus as well as for other uses to which the present invention is applied.

Furthermore, it was not shown in the drawings, however, by making the width dimension of the cross section of the radial ball bearing 1.3 times or more the height in the radial direction, it is possible to enlarge the volume of the internal space of the radial ball bearing and thus increase the amount of grease that can be filled into this internal space. As a result, it is possible to lengthen the life of the grease and improve the durability of the radial ball bearing. This technique of increasing the width dimension of the cross section can of course be performed for the compressor pulley rotation support apparatus of this invention as well as for other uses to which the present invention is applied.

The rotation support apparatus for compressor pulley of this invention, is constructed and functions as described above, and makes it possible to secure the allowable moment load without increasing the dimensions in the axial direction, as well as makes it possible to suppress heat and wear that occur during operation. Therefore, it is possible to lengthen the life of the rolling bearing incorporated in the rotation support apparatus for compressor pulley, and the life of the endless belt that extends around the pulley that is supported by the rolling bearing, which contributes to making it possible to make various machinery, such as the compressor for air-conditioning equipment of an automobile, more compact and higher quality.

What is claimed is:

1. A rotation support apparatus for compressor pulley comprising a rotating shaft for a compressor; a stationary support section formed around the rotating shaft; a rolling bearing supported by the stationary support section; and a pulley rotatably supported by the rolling bearing around the support section, and around which an endless belt is extended, the rolling bearing being a radial ball bearing having a single-row 3-point contact comprising an inner race having an outer peripheral surface formed with an inner-ring raceway, an outer race having an inner peripheral surface formed with an outer-ring raceway, and a plurality of balls located and freely rotating between the inner-ring raceway and outer-ring raceway, the outer peripheral surface of the inner race and the inner peripheral surface of the outer race shaped such that at least one of the inner-ring raceway and outer-ring raceway comes in contact with the rolling surface of each of the balls at two points and the other raceway comes in contact with the rolling surface of each of the balls at one point, the pulley having an outer peripheral portion that comes in contact with the endless belt, such that the distance in the axial direction between the center of the endless belt coming in contact with the outer peripheral surface portion of the pulley and the center of the radial ball bearing is at least 1 mm and 40% or less of the diameter of the pitch circle of the radial ball bearing.

2. A rotation support apparatus for compressor pulley comprising a rotating shaft for a compressor; a stationary support section formed around the rotating shaft; a rolling bearing supported by the stationary support section; and a pulley rotatably supported by the rolling bearing around the support section, and around which an endless belt is extended, the rolling bearing being a radial ball bearing having a 4-point contact-comprising an inner race having an outer peripheral surface formed with an inner-ring raceway, an outer race having an inner peripheral surface formed with an outer-ring raceway, and a plurality of balls located and freely rotating between the inner-ring raceway and outer-ring raceway, the outer peripheral surface of the inner race shaped such that it comes in contact with the rolling surface of the balls at two points, and the inner peripheral surface of the outer race shaped such that it comes in contact with the rolling surface of the balls at two points, the pulley having an outer peripheral portion that comes in contact with the endless belt, such that the distance in the axial direction between the center of the endless belt coming in contact with the outer peripheral surface portion of the pulley and the center of the radial ball bearing is at least 1 mm and 40% or less of the diameter of the pitch circle of the radial ball bearing.

* * * * *